(12) United States Patent
Gjovik et al.

(10) Patent No.: US 11,198,250 B2
(45) Date of Patent: Dec. 14, 2021

(54) FILAMENT CONTAINER

(71) Applicant: Essentium, Inc., College Station, TX (US)

(72) Inventors: Erik John Gjovik, Aliso Viejo, CA (US); Matthew Ross Mitchell, Long Beach, CA (US); William Jack MacNeish, III, Newport Beach, CA (US)

(73) Assignee: Essentium Inc., Pflugerville, TX (US)

( * ) Notice: Subject to any disclaimer, the term of this patent is extended or adjusted under 35 U.S.C. 154(b) by 132 days.

(21) Appl. No.: 16/370,135

(22) Filed: Mar. 29, 2019

(65) Prior Publication Data

US 2020/0307088 A1 Oct. 1, 2020

(51) Int. Cl.
| | | |
|---|---|---|
| *B33Y 30/00* | (2015.01) | |
| *B29C 64/255* | (2017.01) | |
| *B65H 49/38* | (2006.01) | |
| *B33Y 70/00* | (2020.01) | |
| *B29K 101/12* | (2006.01) | |

(52) U.S. Cl.
CPC ........... *B29C 64/255* (2017.08); *B33Y 30/00* (2014.12); *B65H 49/38* (2013.01); *B29K 2101/12* (2013.01); *B33Y 70/00* (2014.12)

(58) Field of Classification Search
CPC ...... B29C 64/30; B29C 64/392; B29C 64/118
See application file for complete search history.

(56) References Cited

U.S. PATENT DOCUMENTS

| | | | | |
|---|---|---|---|---|
| 9,414,893 | B2 * | 8/2016 | Jacobson | B65B 55/00 |
| 2001/0030383 | A1 * | 10/2001 | Swanson | B33Y 30/00 |
| | | | | 264/308 |
| 2012/0286491 | A1 | 11/2012 | Iossa et al. | |
| 2013/0164960 | A1 * | 6/2013 | Swanson | B29C 64/118 |
| | | | | 439/199 |
| 2014/0117585 | A1 * | 5/2014 | Douglas | B33Y 30/00 |
| | | | | 264/401 |
| 2015/0140158 | A1 * | 5/2015 | Cervantes | B29C 64/209 |
| | | | | 425/461 |
| 2017/0096315 | A1 * | 4/2017 | Jackson | H04L 63/102 |
| 2018/0147786 | A1 * | 5/2018 | Hakkaku | B33Y 30/00 |
| 2020/0147882 | A1 * | 5/2020 | Nadeau | B29C 64/393 |

FOREIGN PATENT DOCUMENTS

WO WO-2019034186 A1 * 2/2019 ........... B29C 64/364

* cited by examiner

*Primary Examiner* — Nahida Sultana
*Assistant Examiner* — Margaret B Hayes
(74) *Attorney, Agent, or Firm* — Vivacqua Crane, PLLC

(57) ABSTRACT

A filament container for housing a spool of filament comprising a base and a lid that define an inner volume. The lid rotatably attached to the base and moveable between a closed position, wherein the inner volume is substantially sealed, and an open position, wherein the inner volume is accessible. First and second horizontal shafts are supported rotatably within the inner volume, parallel to and spaced from one another a distance, and rotatable about a respective longitudinal axis. The first and second horizontal shafts are adapted to support a spool of filament vertically within the inner volume and to allow the spool of filament to freely rotate about a horizontal axis that is parallel to and spaced from the longitudinal axis of each of the first and second horizontal shafts as filament is pulled from the spool and out of the filament container.

21 Claims, 4 Drawing Sheets

FILAMENT CONTAINER

INTRODUCTION

The present disclosure relates to a filament container for use with an additive manufacturing machine. Filament is typically supplied on a spool. The filament is pulled directly from the spool into an additive manufacturing machine to be used in making various parts. Commonly used materials in additive manufacturing machines include polymers and thermoplastics. In many instances, a spool of polymer or thermoplastic material is placed into a container that is adapted to support the spool in a manner that allows the filament to easily be pulled from the spool into the additive manufacturing machine.

Another important aspect of a container for a spool of filament is to provide a controlled environment for the filament. To ensure high quality and accuracy in the finished part, it is important that the filament is clean when it is fed into the additive manufacturing machine. Additionally, the presence of moisture on the filament will negatively impact the quality of the finished product.

Polymers and thermoplastics used in additive manufacturing are hygroscopic, which means that they absorb moisture from the air. The presence of moisture becomes a problem when "wet" filament is extruded. When the filament is heated, the excess water vaporizes and creates air bubbles and voids within the print, which weakens it structurally. In addition, "wet" filament can result in increased brittleness, diameter augmentation, degradation, bubbling, and broken filament. As opposed to "wet" filament, filament that has been kept "dry" through proper storage results in consistently higher quality prints and can even result in increased accuracy.

Thus, while current filament delivery systems achieve their intended purpose, there is a need for a new and improved filament container that engages with an additive manufacturing machine, provides a controllable environment for the spool of filament and supports varying sizes of spools of filament in a manner that facilitates easy feeding of the filament into the additive manufacturing machine and easy loading/unloading of spools of filament.

SUMMARY

According to several aspects of the present disclosure, a filament container adapted to house a spool of filament for an additive manufacturing machine comprises a base and a lid, wherein the base and the lid define an inner volume of the filament container. The lid is rotatably attached to the base, and is moveable between a closed position, wherein the inner volume of the filament container is substantially sealed, and an open position, wherein the inner volume of the filament container is accessible for insertion or removal of a spool of filament. A first horizontal shaft and a second horizontal shaft are supported rotatably within the inner volume of the filament container. The first and second horizontal shafts are parallel to and spaced from one another a distance, and each of the first and second horizontal shafts is rotatable about a respective longitudinal axis. The first and second horizontal shafts are adapted to support a spool of filament vertically within the inner volume and to allow the spool of filament to freely rotate about a horizontal axis that is parallel to and spaced from the longitudinal axis of each of the first and second horizontal shafts as filament is pulled from the spool and out of the filament container.

According to another aspect of the present disclosure, the first and second horizontal shafts are independently moveable within the inner volume and the distance between the first and second horizontal shafts is selectively variable, wherein the filament container is adapted to selectively accommodate varying sizes of spools of filament.

According to another aspect of the present disclosure, the filament container further includes a first bearing support rail and a second bearing support rail mounted to the base within the inner volume, and a pair of bearings mounted to each of the first and second horizontal shafts. One bearing is mounted to each opposing distal end of each of the first and second horizontal shafts. Each of the bearing support rails includes a plurality of notches formed therein. The notches formed within the first bearing support rail are aligned with the notches of the second bearing support rail. The first and second bearing support rails are spaced apart from one another such that aligned notches in the first and second bearing support rails support the bearings mounted onto the distal ends of the first horizontal shaft and aligned notches in the first and second bearing support rails support the bearings mounted onto the distal ends of the second horizontal shaft. The bearings are adapted to allow the first and second horizontal shafts to freely rotate.

According to another aspect of the present disclosure, the first and second horizontal shafts each include a channel formed therein, the channels adapted to keep a spool of filament supported thereon centered between the distal ends of the first and second horizontal shafts.

According to another aspect of the present disclosure, the filament container further includes at least one bracket adapted to support an air conditioning device within the inner volume.

According to another aspect of the present disclosure, the air conditioning device is one of an air heater, and air cooler, a dehumidifier, and a humidifier.

According to another aspect of the present disclosure, the air conditioning device is a packet of desiccant material adapted to remove humidity from the inner volume.

According to another aspect of the present disclosure, the filament container further includes an inlet port adapted to allow conditioned air to be pumped into the inner volume of the filament container, and an outlet port adapted to allow air to flow out of the inner volume.

According to another aspect of the present disclosure, the inlet port is adapted to be connected to an external air conditioning unit that pumps conditioned air into the inner volume through the inlet port.

According to another aspect of the present disclosure, the inlet port and the outlet port each include a substantially airtight door that is moveable between an open position and a closed position, wherein the door of the inlet port may be opened to allow airflow through the inlet port, or closed to block airflow through the inlet port, and the door of the outlet port may be opened to allow airflow through the outlet port, or closed to block airflow through the outlet port.

According to another aspect of the present disclosure, the inlet port and the outlet port are adapted to engage corresponding ports on an additive manufacturing machine, wherein conditioned air may be pumped into the inner volume through the inlet port from an air conditioner mounted within the additive manufacturing machine, and air from the inner volume is removed through the outlet port.

According to another aspect of the present disclosure, the doors of the inlet port and the outlet port are attached to the filament container by spring loaded hinges, wherein the hinges are biased to maintain the doors of the inlet port and the outlet port in the closed position.

According to another aspect of the present disclosure, the filament container further includes a first projection, aligned with the inlet port and extending outward, and a second projection, aligned with the outlet port and extending outward, wherein the first and second projections are each adapted to push open a door of a corresponding port in an additive manufacturing machine when the filament container is moved into engagement with the additive manufacturing machine.

According to another aspect of the present disclosure, the filament container further includes a magnetic plate mounted to an exterior surface of the filament container, the magnetic plate adapted to engage a ferrous surface on an additive manufacturing machine, to hold the filament container at a proper position relative to the additive manufacturing machine.

According to another aspect of the present disclosure, the strike plate is positioned between the inlet port and the outlet port.

According to another aspect of the present disclosure, the filament container further includes an electronic communication device to allow information about a spool of filament placed within the filament container to be stored within the electronic communications device. The electronic communication device further adapted to communicate with an additive manufacturing machine to allow the additive manufacturing machine to receive information stored therein.

According to another aspect of the present disclosure, the electronic communication device is a radio frequency tag with read/write capability.

According to another aspect of the present disclosure, the filament container further includes a plurality of casters mounted to a bottom surface of the base.

According to another aspect of the present disclosure, the filament container further includes a filament port formed within the lid and adapted to allow filament to be pulled from the filament container.

According to another aspect of the present disclosure, the filament container further includes a seal extending between the lid and the base to substantially seal the inner volume when the lid is in the closed position.

According to another aspect of the present disclosure, the lid further includes a window to allow visual inspection of the inner volume, a handle mounted onto an outer surface, and a latching mechanism to hold the lid in the closed position, wherein the latch is adapted to allow the lid to be selectively opened and closed.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
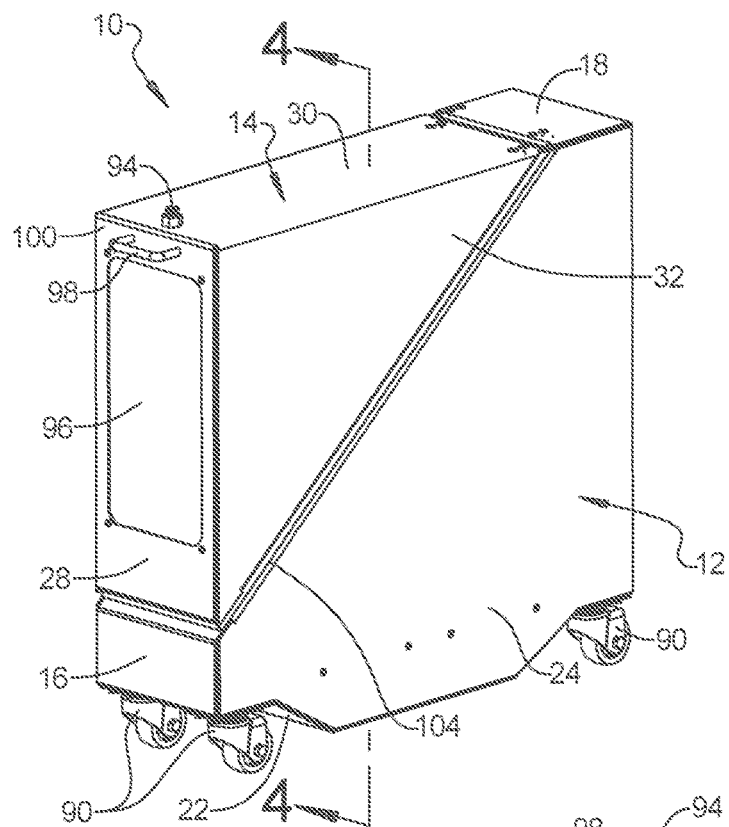
FIG. 1 is a front perspective view of a filament container of the present disclosure according to an exemplary embodiment.
Figure 2:
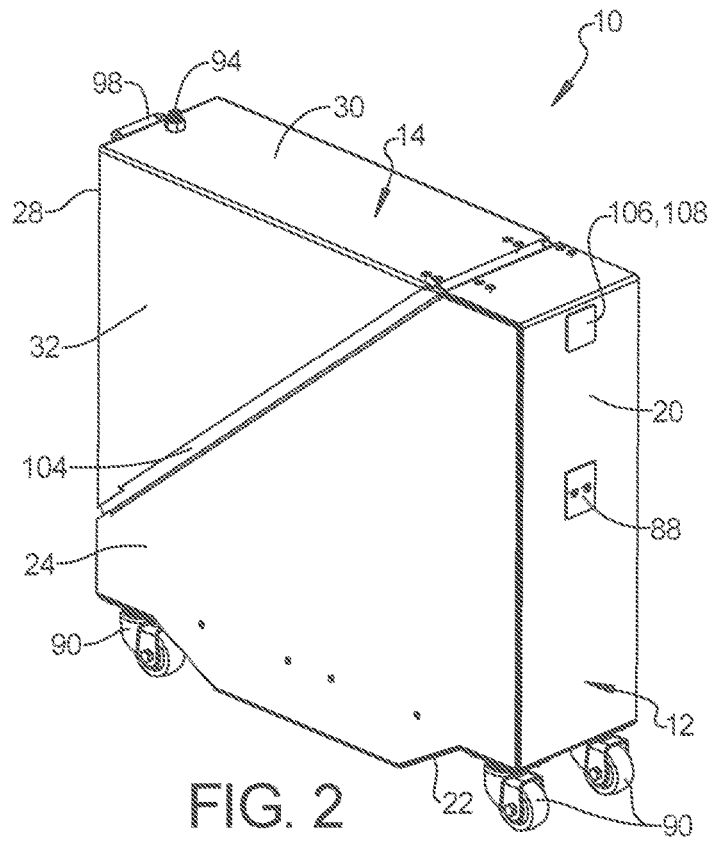
FIG. 2 is a rear perspective view of the filament container shown in FIG. 1.

Referring to FIG. 1 and FIG. 2, a filament container 10 of the present disclosure is adapted to house a spool of filament for an additive manufacturing machine. The filament container 10 comprises a base 12 and a lid 14. The base 12 includes a front panel 16, a top panel 18, a rear panel 20, a bottom panel 22, and first and second side panels 24, 26. The lid includes a front panel 28, a top panel 30, and first and second side panels 32, 34.

A plurality of casters 90 are mounted to a bottom surface 92 of the bottom panel 22 of the base 12. Depending on the size of the spool of filament and the type of filament on the spool, the weight of the filament container 10 when loaded with a spool of filament may be substantial. The casters 90 allow the filament container 10 to be easily moved without lifting the filament container 10.

Figure 3:
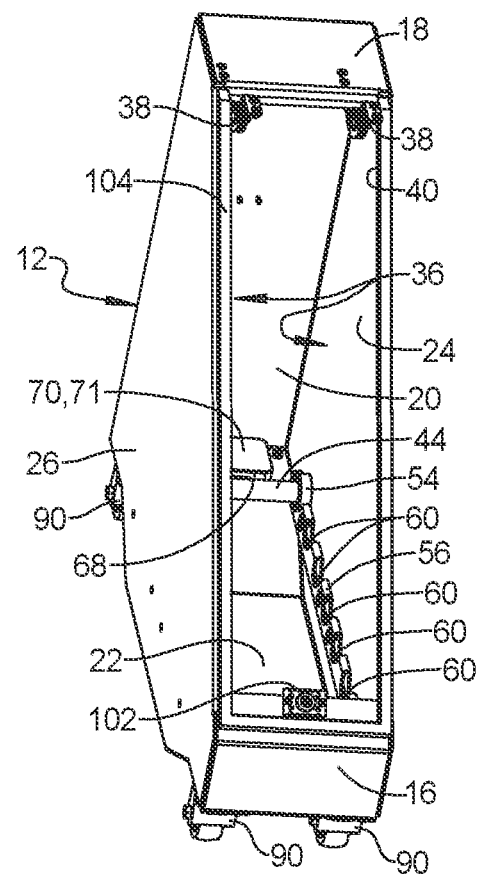
FIG. 3 is a perspective view of the filament container shown in FIG. 1 with a lid of the filament container removed.
Figure 4:
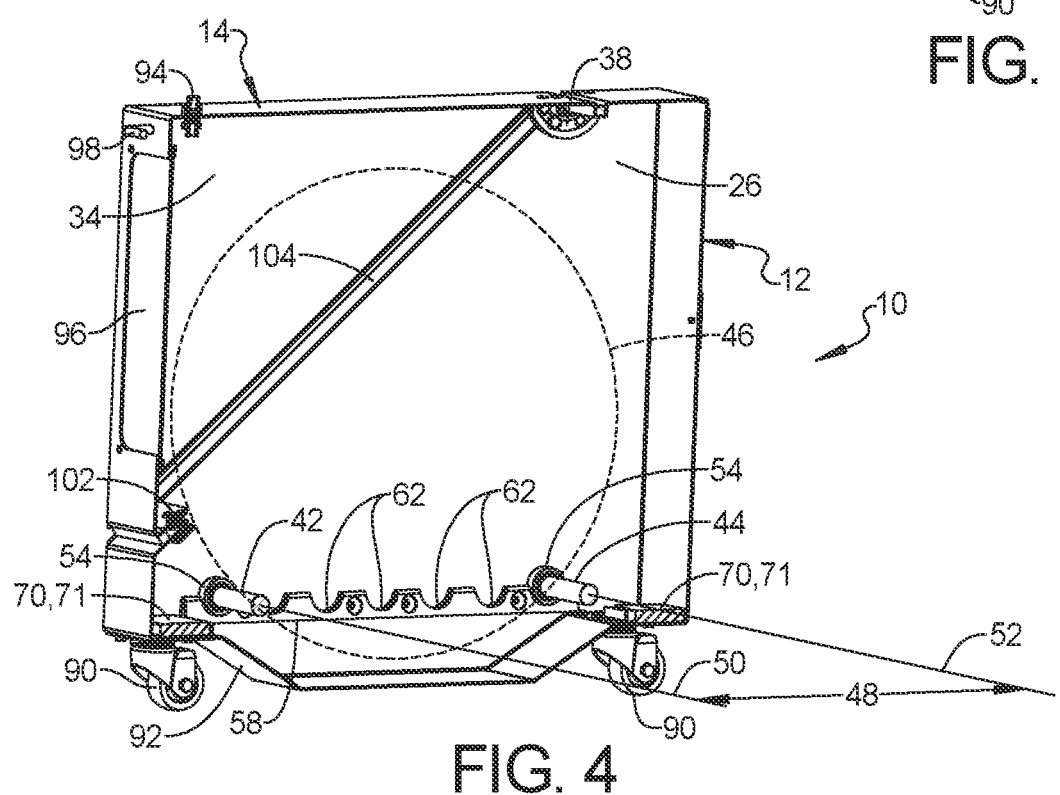
FIG. 4 is a sectional view of the filament container shown in FIG. 1, taken along line 4-4.

The base 12 and the lid 14 define an inner volume 36 of the filament container 10. The lid 14 is rotatably attached to the base 12. As shown in FIG. 3 and FIG. 4, the lid 14 is attached to the base 12 with two hinges 38. The hinges 38 hold the lid 14 securely on the base 12 and allow the lid 14 to be moveable between a closed position and an open position. In the closed position, the inner volume 36 of the filament container 10 is substantially sealed. In the open position, the inner volume 36 of the filament container 10 is accessible for insertion or removal of a spool of filament.

A filament port 94 is formed within the top panel 30 of the lid 14. The filament port 94 allows filament from a spool within the inner volume 36 of the filament container 10 to be pulled from the filament container 10, into an additive manufacturing machine. The lid 14 further includes a window 96 to allow visual inspection of the inner volume 36. A handle 98 is mounted onto an outer surface 100 of the front panel 28 of the lid 14. A latching mechanism 102 holds the lid 14 in the closed position, and is adapted to allow the lid 14 to be selectively opened and closed.

Referring to FIG. 3, the base 12 is shown without the lid 14 attached thereto. Edges of the two side panels 24, 26, the top panel 18 and the front panel 16 of the base 12 define an opening 40. A seal 104 extends around the opening 40, between the lid 14 and the base 12 to substantially seal the inner volume 36 when the lid 14 is in the closed position.

The opening 40 allows a spool of filament to be placed within the inner volume 36 when the lid 14 is open. The filament container 10 is adapted to support a cylindrical spool of filament within the inner volume 36. A first horizontal shaft 42 and a second horizontal shaft 44 are supported rotatably within the inner volume 36 of the filament container 10. The first and second horizontal shafts 42, 44 are adapted to support a spool of filament vertically within the inner volume 36, as shown in phantom at 46 in FIG. 4.

The first and second horizontal shafts 42, 44 are parallel to one another and are spaced from one another a distance 48. Each of the first and second horizontal shafts 42, 44 is rotatable about a respective longitudinal axis 50, 52. Each of the first and second horizontal shafts 42, 44 includes a pair of bearings 54, one bearing 54 being mounted to each opposing distal end.

A first bearing support rail 56 and a second bearing support rail 58 are mounted to the base 12 within the inner volume 36. The first bearing support rail 56 is mounted horizontally to an inner surface of the first side panel 24 of the base 12 and the second bearing support rail 58 is mounted horizontally to an inner surface of the second side panel 26 of the base 12. The first bearing support rail 56 includes a plurality of notches 60 formed therein, and the second bearing support rail 58 includes a plurality of notches 62 formed therein. The notches 60 formed within the first bearing support rail 56 are aligned with the notches 62 of the second bearing support rail 58. The notches 60, 62 are adapted to support the bearings 54 mounted onto the distal ends of the first and second horizontal shafts 42, 44.

The first and second bearing support rails 56, 58 are spaced apart from one another. The bearings 54 mounted onto the distal ends of the first horizontal shaft 42 are supported by a first pair of aligned notches 60, 62 in the first and second bearing support rails 56, 58. The bearings 54 mounted onto the distal ends of the second horizontal shaft 44 are supported by a second pair of aligned notches 60, 62 in the first and second bearing support rails 56, 58.

The bearings 54 allow the first and second horizontal shafts 42, 44 to freely rotate. When filament is pulled from the spool of filament supported within the filament container 10, the spool will rotate about a horizontal center axis that is parallel to and spaced from the longitudinal axis 50, 52 of each of the first and second horizontal shafts 42, 44 as the filament is un-coiled from the spool. As the spool rotates, frictional contact between the spool and the first and second horizontal shafts 42, 44 will cause the first and second horizontal shafts 42, 44 to rotate along with the spool in a rotational direction opposite that of the spool, such that there is no sliding contact between the spool and the first and second horizontal shafts 42, 44.

The first and second bearing support rails 56, 58 each include a plurality of aligned notches 60, 62. The first and second horizontal shafts 42, 44 are moveable between different aligned pairs of notches 60, 62. By moving the first and second horizontal shafts 42, 44 relative to one another, the distance 48 between the first and second horizontal shafts 42, 44 can be selectively varied. The ability to change the distance 48 between the first and second horizontal shafts 42, 44 allows the filament container 10 to adapt to spools of varying size.

Figure 8:
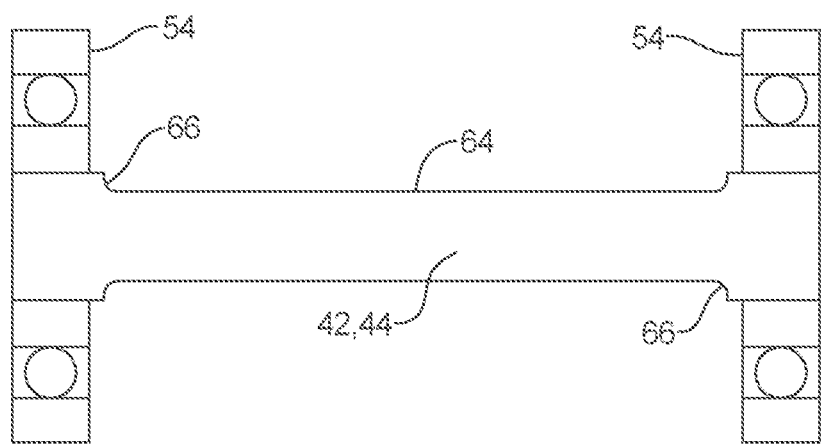
FIG. 8 is a sectional view of a horizontal shaft of the filament container.

Referring to FIG. 8, in one non-limiting exemplary embodiment, the first and second horizontal shafts 42, 44 each include a channel 64 formed therein. The channels 64 are adapted to keep a spool of filament supported thereon centered between the distal ends of the first and second horizontal shafts 42, 44. As shown in FIG. 8, a substantially U-shaped channel 64 is formed within the outer surface of the first and second horizontal shafts 42, 44. A U-shaped channel 64 extends completely around the circumference of each of the first and second horizontal shafts 42, 44, and longitudinally along the length of each of the first and second horizontal shafts 42, 44 between the bearings 54. The channel 64 includes edges 66 that provide a positive stop to keep the spool from migrating toward either distal end of the first and second horizontal shafts 42, 44. This prevents the spool from coming into contact with the bearings 54, or any surface within the inner volume 36, other than the first and second horizontal shafts 42, 44. The first and second horizontal shafts 42, 44 rotate, thereby reducing the frictional resistance to rotation of the spool within the filament container 10, as discussed previously. By keeping the spool centered on the first and second horizontal shafts 42, 44 the spool is prevented from coming into contact with other surfaces that may interfere with rotation of the spool.

The filament container 10 further includes at least one bracket 68 that is adapted to support an air conditioning device 70 within the inner volume. To maintain the integrity of the filament stored therein, the inner volume 36 of the filament container 10 may be conditioned to maintain specific temperature or humidity conditions within the inner volume 36. By way of non-limiting examples, the air conditioning device may be one of an air heater, and air cooler, a dehumidifier, and a humidifier. One common issue when dealing with polymer and thermoplastic filaments is moisture content on and within the filament. The bracket 68 of the filament container 10 of the present disclosure supports a packet of desiccant material 71 to control the level of humidity within the inner volume 36. By way of non-limiting example, the packet of desiccant material 71, may contain silica gel or beads, to absorb moisture from the air and reduce the humidity within the inner volume 36.

The filament container 10 of the present disclosure further includes an electronic communication device 106 to allow information about a spool of filament placed within the filament container 10 to be stored with the filament container 10. The electronic communication device 106 is adapted to communicate with an additive manufacturing machine to allow the additive manufacturing machine to receive information stored therein.

In an exemplary embodiment of the present disclosure, the electronic communication device 106 is a radio frequency tag 108 with read/write capability. When a spool of filament is loaded into the filament container 10, identifying information about the filament can be written to the radio frequency tag 108. When the filament container 10 is placed into engagement with an additive manufacturing machine, information stored on the radio frequency tag 108 is read by the additive manufacturing machine. This allows the additive manufacturing machine to verify that the correct type of filament is being used for the current operation. The radio frequency tag 108 is read/write capable, and therefore, is re-usable. When the filament within the filament container 10 is changed, new information can be over-written to the radio frequency tag 108 to replace the existing information, insuring that the information sent to the additive manufacturing machine by from the radio frequency tag 108 is accurate.

Figure 5:
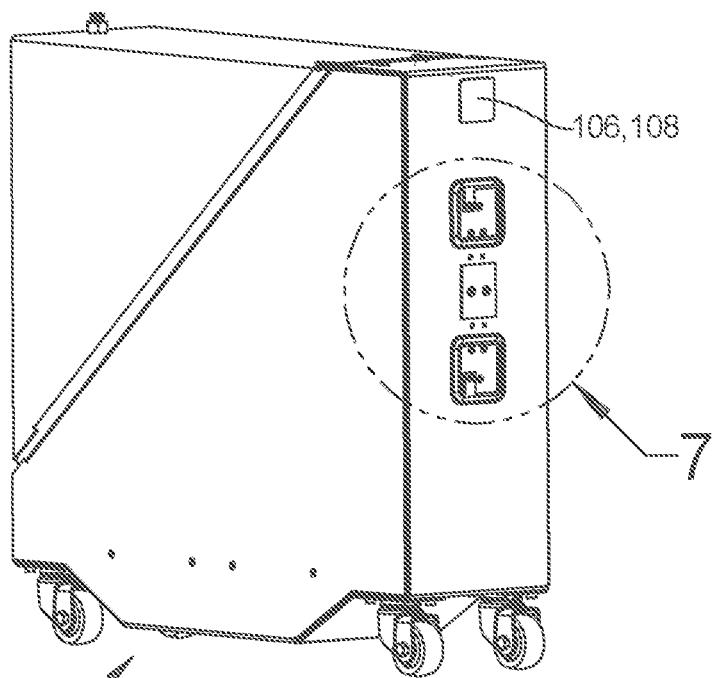
FIG. 5 is a rear perspective view of a filament container of the present disclosure according to another exemplary embodiment.
Figure 6:
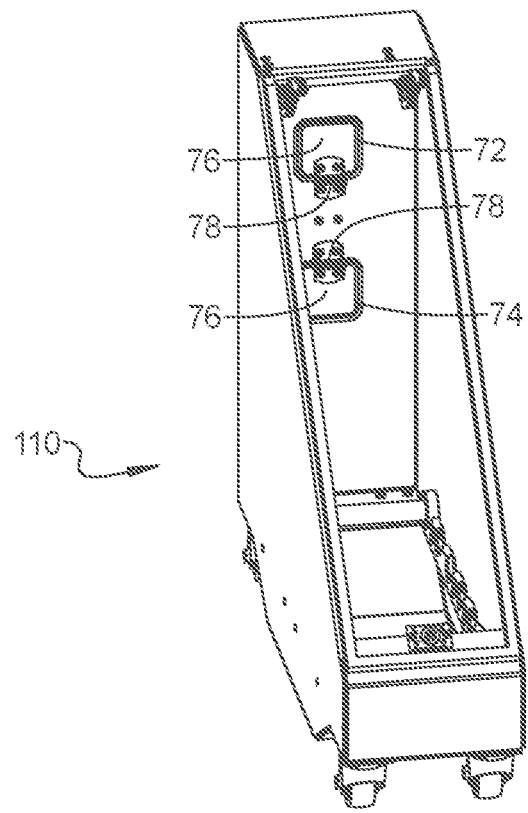
FIG. 6 is a perspective view of the filament container shown in FIG. 5 with a lid of the filament container removed.
Figure 7:
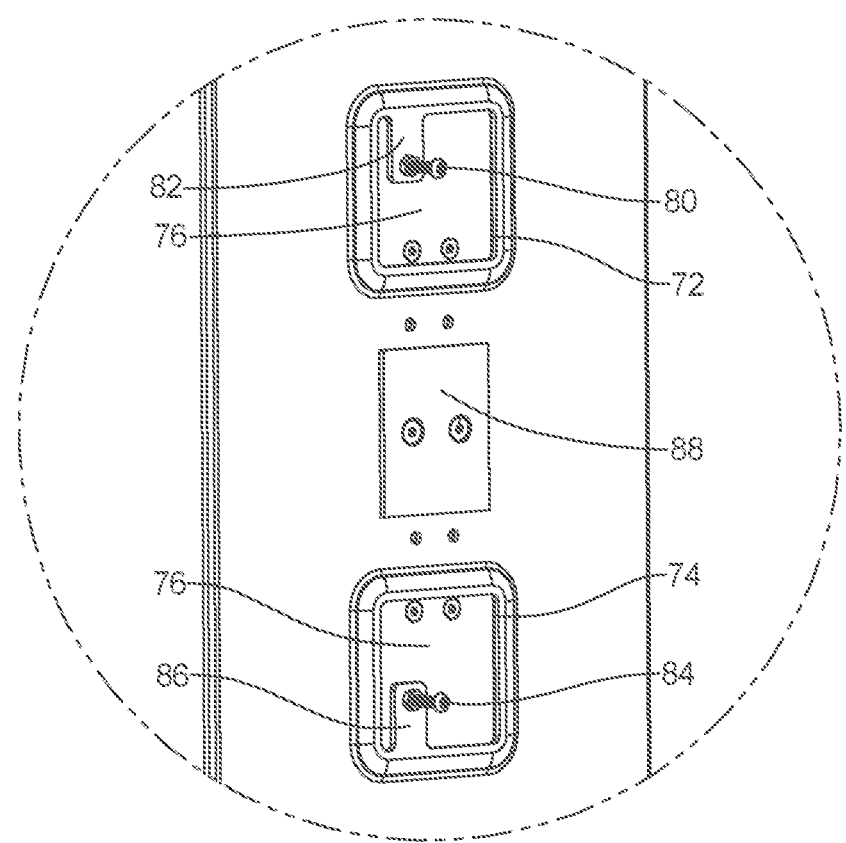
FIG. 7 is a an enlarged view of a portion of FIG. 5.

Referring to FIG. 5, FIG. 6 and FIG. 7, in an exemplary embodiment, the filament container 110 includes an inlet port 72 adapted to allow conditioned air to be pumped into the inner volume 36 of the filament container 110, and an outlet port 74 adapted to allow air to flow out of the inner volume 36. The inlet port 72 is adapted to be connected to an external air conditioning unit that pumps conditioned air into the inner volume 36 through the inlet port 72.

The inlet port 72 and the outlet port 74 each include a substantially airtight door 76 that is moveable between an open position and a closed position. Each door 76 is attached to the filament container 110 by a spring loaded hinge 78.

The hinges 78 are biased to maintain the doors 76 of the inlet port 72 and the outlet port 74 in the closed position. When the doors 76 are pushed inward with enough force to overcome the spring bias of the hinges 78, the doors 76 will pivot to the open position. The door 76 of the inlet port 72 may be opened to allow airflow into the inner volume 36 through the inlet port 72, or closed to block airflow through the inlet port 72. The door 76 of the outlet port 74 may be opened to allow airflow out of the inner volume 36 through the outlet port 74, or closed to block airflow through the outlet port 74.

The inlet port 72 and the outlet port 74 are adapted to engage corresponding ports on an additive manufacturing machine. The additive manufacturing machine may be equipped with an air conditioning device, wherein, when the filament container 10 is connected to the additive manufacturing machine, conditioned air is pumped into the inner volume 36 through the inlet port 72. Generally, as moisture within the inner volume is a major concern, warmed dry air is pumped into the inner volume to promote evaporation of moisture from the filament stored within the filament container 110. Simultaneously, air from within the inner volume 36 is allowed to exit the inner volume 36 through the outlet port 74. As warmed dry air is pumped into the inner volume 36, higher humidity air is leaving the inner volume 36 through the outlet port 74. The air exiting the inner volume 36 through the outlet port 74 may be vented directly to the outside. Alternatively, the air vented from the inner volume 36 may be captured by the air conditioning device within the additive manufacturing machine to be analyzed. The humidity of the air being vented from the inner volume 36 may be measured to determine the level of humidity within the filament container 10 and control the air conditioning device within the additive manufacturing machine.

The filament container 110 includes a first projection 80, aligned with the inlet port 72 and extending outward. A first tab 82 extends laterally from the rear panel 20 of the base 12 in front of the door 76 of the inlet port 72. The first projection 80 extends from the first tab 82 outward away from the rear panel 20 of the base 12. The filament container 110 includes a second projection 84, aligned with the outlet port 74 and extending outward. A second tab 86 extends laterally from the rear panel 20 of the base 12 in front of the door 76 of the outlet port 76. The second projection 84 extends from the second tab 86 outward away from the rear panel 20 of the base 12. The first and second projections 80, 84 are each adapted to push open a door of a corresponding port in an additive manufacturing machine when the filament container 110 is moved into engagement with the additive manufacturing machine. The additive manufacturing machine will be equipped with similar projections adapted to push against the doors 76 of the inlet port 72 and the outlet port 74, overcoming the spring bias of the hinges 78 to open the doors 76 of the inlet port 72 and the outlet port 74.

A magnetic plate 88 is mounted onto an exterior surface of the rear panel 20 of the base 12 to hold the filament container 10, 110 in engagement with an additive manufacturing machine. The magnetic plate 88 is adapted to contact a ferrous surface on an additive manufacturing machine to hold the filament container 10, 110 at a proper position relative to the additive manufacturing machine. As shown, the magnetic plate 88 is positioned between the inlet port 72 and the outlet port 74. Positioning the magnetic plate 88 in close proximity to the inlet port 72 and the outlet port 74 helps to ensure a substantially sealed connection between the inlet port 72 and the outlet port 74 and corresponding ports on the additive manufacturing machine.

A filament container 10, 110 of the present disclosure offers several advantages. Spools of filament of varying sizes can be loaded and unloaded easily through a front/top opening due to the fact that the spool is supported on top of the first and second horizontal shafts 42, 44. The spool is not supported on a central shaft, therefore, the spool does not require dis-assembly/re-assembly of a central shaft in order to remove or insert a spool of filament. Furthermore, the filament container 10, 110 of the present disclosure provides inlet and outlet ports 72, 74 that allow conditioned air to be circulated through the inner volume 36 of the filament container 10, 110 from an external air conditioning unit that may be integral to the additive manufacturing machine.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A filament container adapted to house a spool of filament for an additive manufacturing machine comprising:
   a base and a lid, wherein the base and the lid define an inner volume of the filament container, the lid rotatably attached to the base, wherein the lid is moveable between a closed position, wherein the inner volume of the filament container is substantially sealed, and an open position, wherein the inner volume of the filament container is accessible for insertion or removal of the spool of filament; and
   a first horizontal shaft and a second horizontal shaft supported rotatably within the inner volume of the filament container, the first and second horizontal shafts parallel to and spaced from one another by a distance, and each of the first and second horizontal shafts rotatable about a respective longitudinal axis; and
   wherein the inner volume has a height and a depth, orthogonal to one another and both orthogonal to the respective longitudinal axes of the first and second horizontal shafts, with each of the height and the depth being greater than the distance between the first and second horizontal shafts, and with the first and second horizontal shafts adapted to support a single spool of filament vertically within the inner volume and to allow the spool of filament to freely rotate about a horizontal axis that is parallel to and spaced from the longitudinal axis of each of the first and second horizontal shafts as filament is pulled from the spool and out of the filament container.

2. The filament container of claim 1, wherein the first and second horizontal shafts are independently moveable within the inner volume and the distance between the first and second horizontal shafts is selectively variable, wherein the filament container is adapted to selectively accommodate varying sizes of spools of filament.

3. The filament container of claim 1, wherein the first and second horizontal shafts each include a channel formed therein, the channels adapted to keep the spool of filament supported thereon centered between a pair of distal ends of the first and second horizontal shafts.

4. The filament container of claim 1, further including:
   at least one bracket adapted to support an air conditioning device within the inner volume.

5. The filament container of claim 4, wherein the air conditioning device is one of an air heater, an air cooler, a dehumidifier, and a humidifier.

6. The filament container of claim 4, wherein the air conditioning device is a packet of desiccant material adapted to remove humidity from the inner volume.

7. The filament container of claim 1, further including an inlet port adapted to allow conditioned air to be pumped into the inner volume of the filament container, and an outlet port adapted to allow air to flow out of the inner volume.

8. The filament container of claim 7, wherein the inlet port is adapted to be connected to an external air conditioning unit that pumps conditioned air into the inner volume through the inlet port.

9. The filament container of claim 7, wherein the inlet port and the outlet port each include a substantially airtight door that is moveable between an open position and a closed position, wherein the substantially airtight door of the inlet port may be opened to allow airflow through the inlet port, or closed to block airflow through the inlet port, and the substantially airtight door of the outlet port may be opened to allow airflow through the outlet port, or closed to block airflow through the outlet port.

10. The filament container of claim 9, wherein the inlet port and the outlet port are adapted to engage corresponding ports on an additive manufacturing machine, wherein conditioned air may be pumped into the inner volume through the inlet port from an air conditioner mounted within the additive manufacturing machine, and air from the inner volume is removed through the outlet port.

11. The filament container of claim 10, wherein the substantially airtight doors of the inlet port and the outlet port are attached to the filament container by spring loaded hinges, wherein the spring loaded hinges are biased to maintain the substantially airtight doors of the inlet port and the outlet port in the closed position.

12. The filament container of claim 11, further including a first projection, aligned with the inlet port and extending outward, and a second projection, aligned with the outlet port and extending outward, wherein the first and second projections are each adapted to push open a corresponding door of a corresponding port in an additive manufacturing machine when the filament container is moved into engagement with the additive manufacturing machine.

13. The filament container of claim 1, further including a magnetic plate mounted to an exterior surface of the filament container, the magnetic plate adapted to engage a ferrous surface on an additive manufacturing machine, to hold the filament container at a proper position relative to the additive manufacturing machine.

14. The filament container of claim 13, wherein the magnetic plate is positioned between the inlet port and the outlet port.

15. The filament container of claim 1, further including an electronic communication device to allow information about a spool of filament placed within the filament container to be stored within the electronic communication device, the electronic communication device further adapted to communicate with an additive manufacturing machine to allow the additive manufacturing machine to receive information stored therein.

16. The filament container of claim 15, wherein the electronic communication device is a radio frequency tag with reading and writing capability.

17. The filament container of claim 1, further including a plurality of casters mounted to a bottom surface of the base.

18. The filament container of claim 1, further including a filament port formed within the lid and adapted to allow filament to be pulled from the filament container, and a seal extending between the lid and the base to substantially seal the inner volume when the lid is in the closed position.

19. The filament container of claim 1, wherein the lid further includes a window to allow visual inspection of the inner volume, a handle mounted onto an outer surface, and a latching mechanism to hold the lid in the closed position, wherein the latching mechanism is adapted to allow the lid to be selectively opened and closed.

20. A filament container adapted to house a spool of filament for an additive manufacturing machine comprising:
a base and a lid, wherein the base and the lid define an inner volume of the filament container, the lid rotatably attached to the base, wherein the lid is moveable between a closed position, wherein the inner volume of the filament container is substantially sealed, and an open position, wherein the inner volume of the filament container is accessible for insertion or removal of the spool of filament;
an inlet port adapted to allow conditioned air to be pumped into the inner volume of the filament container, and an outlet port adapted to allow air to flow out of the inner volume, wherein, the inlet port and the outlet port each include a substantially airtight door that is moveable between an open position and a closed position, and adapted to engage corresponding ports on an additive manufacturing machine, wherein the door of the inlet port may be opened to allow conditioned air to be pumped into the inner volume through the inlet port from an air conditioner mounted within the additive manufacturing machine, or closed to block airflow through the inlet port, and the door of the outlet port may be opened to allow airflow out from the inner volume through the outlet port, or closed to block airflow through the outlet port, the doors of the inlet port and the outlet port each attached to the filament container by spring loaded hinges, wherein the spring loaded hinges are biased to maintain the doors of the inlet port and the outlet port in the closed position;
a first projection, aligned with the inlet port and extending outward, and a second projection, aligned with the outlet port and extending outward, wherein the first and second projections are each adapted to push open a corresponding door of a corresponding port in an additive manufacturing machine when the filament container is moved into engagement with the additive manufacturing machine; and
a first horizontal shaft and a second horizontal shaft supported rotatably within the inner volume of the filament container, the first and second horizontal shafts parallel to and spaced from one another by a distance, and each of the first and second horizontal shafts rotatable about a respective longitudinal axis; and
wherein the inner volume has a height and a depth, orthogonal to one another and both orthogonal to the longitudinal axes of the first and second horizontal shafts, with each of the height and the depth being greater than the distance between the first and second horizontal shafts, and with the first and second horizontal shafts adapted to support a single spool of filament vertically within the inner volume and to allow the spool of filament to freely rotate about a horizontal axis that is parallel to and spaced from the longitudinal axis of each of the first and second horizontal shafts as filament is pulled from the spool and out of the filament container.

21. A filament container adapted to house a spool of filament for an additive manufacturing machine comprising:
- a base and a lid, wherein the base and the lid define an inner volume of the filament container, the lid rotatably attached to the base, wherein the lid is moveable between a closed position, wherein the inner volume of the filament container is substantially sealed, and an open position, wherein the inner volume of the filament container is accessible for insertion or removal of the spool of filament; and
- a first horizontal shaft and a second horizontal shaft supported rotatably within the inner volume of the filament container, the first and second horizontal shafts parallel to and spaced from one another by a distance, and each of the first and second horizontal shafts rotatable about a respective longitudinal axis;
- a first bearing support rail and a second bearing support rail mounted to the base within the inner volume; and
- a pair of bearings mounted to each of the first and second horizontal shafts, one bearing being mounted to each opposing distal end of each of the first and second horizontal shafts;
- wherein the inner volume has a height and a depth, orthogonal to one another and both orthogonal to the longitudinal axes of the first and second horizontal shafts, with each of the height and the depth being greater than the distance between the first and second horizontal shafts, and with the first and second horizontal shafts adapted to support a single spool of filament vertically within the inner volume and to allow the spool of filament to freely rotate about a horizontal axis that is parallel to and spaced from the longitudinal axis of each of the first and second horizontal shafts as filament is pulled from the spool and out of the filament container;
- wherein the first and second horizontal shafts are independently moveable within the inner volume and the distance between the first and second horizontal shafts is selectively variable, wherein the filament container is adapted to selectively accommodate varying sizes of spools of filament; and
- wherein each of the bearing support rails includes a plurality of notches formed therein, the plurality of notches formed within the first bearing support rail being aligned with the plurality of notches of the second bearing support rail, the first and second bearing support rails being spaced apart from one another such that the plurality of notches that are aligned in the first and second bearing support rails support the bearings mounted onto the distal ends of the first horizontal shaft and the plurality of notches that are aligned in the first and second bearing support rails support the bearings mounted onto the distal ends of the second horizontal shaft, the bearings adapted to allow the first and second horizontal shafts to freely rotate.

* * * * *